United States Patent
Haynes et al.

[11] Patent Number: 6,001,303
[45] Date of Patent: Dec. 14, 1999

[54] PROCESS OF MAKING FIBERS

[75] Inventors: Bryan D. Haynes, Cumming; Jeffrey L. McManus, Canton; Rick Busby, Decatur, all of Ga.

[73] Assignee: Kimberly-Clark Worldwide, Inc.

[21] Appl. No.: 08/994,373

[22] Filed: Dec. 19, 1997

[51] Int. Cl.$^6$ .......................... D01D 5/084; D01D 5/088; D01D 5/14

[52] U.S. Cl. ................. 264/555; 264/210.8; 264/211.14; 264/211.17

[58] Field of Search ........................... 264/210.8, 211.14, 264/211.17, 555

[56] References Cited

U.S. PATENT DOCUMENTS

| | | |
|---|---|---|
| 3,357,808 | 12/1967 | Eberle . |
| 3,588,951 | 6/1971 | Hegmann . |
| 3,825,380 | 7/1974 | Harding et al. . |
| 3,920,362 | 11/1975 | Bradt . |
| 3,959,421 | 5/1976 | Weber et al. . |
| 4,112,159 | 9/1978 | Pall . |
| 4,380,570 | 4/1983 | Schwarz . |
| 4,526,733 | 7/1985 | Lau . |
| 5,075,068 | 12/1991 | Milligan et al. . |
| 5,080,569 | 1/1992 | Gubernick et al. . |
| 5,098,636 | 3/1992 | Balk . |
| 5,141,699 | 8/1992 | Meyer et al. . |
| 5,160,746 | 11/1992 | Dodge, II et al. . |
| 5,196,049 | 3/1993 | Coombs et al. . |
| 5,445,785 | 8/1995 | Rhim ....................................... 264/555 |
| 5,607,701 | 3/1997 | Allen et al. . |

FOREIGN PATENT DOCUMENTS

| | | |
|---|---|---|
| 212540 | 3/1987 | European Pat. Off. . |
| 322136 | 6/1989 | European Pat. Off. . |

*Primary Examiner*—Leo B. Tentoni
*Attorney, Agent, or Firm*—Dority & Manning, P.A.

[57] ABSTRACT

An apparatus and process for producing meltblown fibers employs a coflowing primary cold air flow and secondary hot air flow in a meltblowing nozzle. The primary cold air flow provides the majority of the force used to attenuate the polymer stream into fibers, while a secondary hot air flow shrouds the die tip and prevents premature quenching.

6 Claims, 6 Drawing Sheets

PROCESS OF MAKING FIBERS

FIELD OF THE INVENTION

The present invention relates to an apparatus and process for forming meltblown fibers. More specifically, the present invention relates to an apparatus and process for forming meltblown fibers utilizing a gas for drawing the fibers that is at a temperature below the melting point of the polymer from which the fibers are made.

BACKGROUND OF THE INVENTION

Meltblown fibers are fibers formed by extruding a molten thermoplastic material through a plurality of fine, usually circular, die capillaries as molten threads or filaments into converging, usually hot and high velocity, gas (e.g. air) streams to attenuate the filaments of molten thermoplastic material and form fibers. During the meltblowing process, the diameter of the molten filaments are reduced by the drawing air to a desired size. Thereafter, the meltblown fibers are carried by the high velocity gas stream and are deposited on a collecting surface to form a web of randomly disbursed meltblown fibers. Such a process is disclosed, for example, in U.S. Pat. Nos. 3,849,241 to Buntin et al., 4,526,733 to Lau, and 5,160,746 to Dodge, II et al., all of which are hereby incorporated herein by this reference. Meltblown fibers may be continuous or discontinuous and are generally smaller than ten microns in average diameter.

In a conventional meltblowing process, molten polymer is provided to a die that is disposed between a pair of air plates that form a primary air nozzle. Standard meltblown equipment includes a die tip with a single row of capillaries along a knife edge. Typical die tips have approximately 30 capillary exit holes per linear inch of die width. The die tip is typically a 60° wedge-shaped block converging at the knife edge at the point where the capillaries are located. The air plates in many known meltblowing nozzles are mounted in a recessed configuration such that the tip of the die is set back from the primary air nozzle. However, air plates in some nozzles are mounted in a flush configuration where the air plate ends are in the same horizontal plane as the die tip; in other nozzles the die tip is in a protruding or "stick-out" configuration so that the tip of the die extends past the ends of the air plates. Moreover, as disclosed in U.S. Pat. No. 5,160,746 to Dodge II et al, more than one air flow stream can be provided for use in the nozzle.

In most known configurations of meltblowing nozzles, hot air is provided through the primary air nozzle formed on each side of the die tip. The hot air heats the die and thus prevents the die from freezing as the molten polymer exits and cools. In this way the die is prevented from becoming clogged with solidifying polymer. The hot air also draws, or attenuates, the melt into fibers.

Primary hot air flow rates typically range from about 20 to 24 standard cubic feet per minute per inch of die width (scfm/in).

Primary air pressure typically ranges from 5 to 10 pounds per square inch gauge (psig). Primary air temperature typically ranges from 450° to 600° Fahrenheit (F), but temperatures of 750° F. are not uncommon. The particular temperature of the primary hot air flow will depend on the particular polymer being drawn as well as other characteristics desired in the meltblown web.

Expressed in terms of the amount of polymer material flowing per inch of the die per unit of time, polymer throughput is typically 0.5 to 1.25 grams per hole per minute (ghm). Thus, for a die having 30 holes per inch, polymer throughput is typically about 2 to 5 lbs/inch/hour (PIH).

Moreover, in order to form meltblown fibers from an input of about five pounds per inch per hour of the polymer melt, about one hundred pounds per inch per hour of hot air is required to draw or attenuate the melt into discrete fibers. This drawing air must be heated to a temperature on the order of 400–600° F. in order to maintain proper heat to the die tip.

Because such high temperatures must be used, a substantial amount of heat must be removed from the fibers in order to quench (or solidify) the fibers leaving the die orifice. Cold gases, such as air, have been used to accelerate cooling and solidification of the meltblown fibers. In particular, in U.S. Pat. No. 5,075,068 to Milligan et al and U.S. Pat. No. 5,080,569 to Gubernick et al, which are hereby incorporated herein by reference, secondary air flowing in a cross-flow perpendicular, or 90°, direction relative to the direction of fiber elongation, has been used to quench meltblown fibers and produce smaller diameter fibers. In addition, U.S. Pat. No. 5,607,701 to Allen et al, which is hereby incorporated herein by reference, uses a cooler pressurized quench air that fills chamber 71 and results in faster cooling and solidification of the fibers. In U.S. Pat. No. 4,112,159 to Pall, which is hereby incorporated herein by reference, a cold air flow is used to attenuate the fibers when it is desired to decrease the attenuation of the fibers.

Generally, in a typical meltblown process, the energy in the primary air is approximately seven times that required for the polymer stream, and the temperature range of the hot primary air will generally be 500° F. to 550° F. The conventional meltblown process has high energy demands because the polymer must be heated, the die tip must be kept heated, hot primary air flow attenuates the polymer to the desired diameter, and the hot attenuated fibers must be quenched. Thus, the meltblowing process is energy intensive, both in adding heat during fiber formation and in removing heat during fiber quenching.

Through the control of air and die tip temperatures, air pressure, and polymer feed rate, the diameter of the fiber formed during the meltblown process may be regulated. For example, typical meltblown polypropylene fibers have a diameter of 3 to 4 microns.

After cooling, the fibers are collected to form an integrated web. In particular, the fibers are collected on a forming web that comprises a moving mesh screen or belt located below the die tip. In order to provide enough space beneath the die tip for fiber forming, attenuation and cooling, forming distances of at least about 8 to 12 inches between the polymer die tip and the top of the mesh screen are required in the typical meltblowing process.

However, forming distances as low as 4 inches are described in U.S. Pat. No. 4,526,733 to Lau (hereafter the '733 patent), which is hereby incorporated herein by reference. As described in Example 3 of the '733 patent, the shorter forming distances are achieved with attenuating air flows of at least 100° F. cooler than the temperature of the molten polymer. For example, Lau discloses the use of attenuating air at 150° F. for polypropylene melt at a temperature of 511° F. to allow a forming distance between die tip and forming belt of 4 inches. The Lau patent incorporates passive air gaps 36 (shown in FIG. 4 of Lau) to insulate the die tip.

Zebra striping is a problem that sometimes results during high speed meltblowing line applications. Stripes may form in the cross machine direction, resulting from the flapping of the turbulent air jet. If the forming distance between the die and the forming fabrics can be decreased, Zebra striping will likewise be decreased. Uniformity will also improve due to the smaller scale turbulent structure in the primary air jet at low forming distances. As the forming distance increases, the primary air jet decays more and the formation becomes worse.

OBJECTS AND SUMMARY OF THE INVENTION

It is an object of the present invention to provide an improved apparatus and method for producing meltblown fibers.

It also is an object of the present invention to provide an improved apparatus and method for producing meltblown fibers that is more energy efficient than conventional apparatus and methods.

It is a further object of the present invention to provide an improved apparatus and method for producing meltblown fibers that uses a secondary flow of heated air to maintain the die at the desired temperature to avoid freezing of the polymer melt, yet attenuates the hot melt into fibers primarily through the use of relatively colder air flows.

It is another object of the present invention to provide an improved apparatus and method for producing meltblown fibers that uses a secondary flow of heated air to maintain the die at the desired temperature to avoid freezing of the polymer melt, yet attenuates the hot melt into fibers primarily through the use of relatively colder air flows so as to permit more rapid quenching of the fibers than in conventional apparatus and methods.

It is a still further object of the present invention to provide an improved apparatus and method for producing meltblown fibers that uses a secondary flow of heated air to maintain the die at the desired temperature to avoid freezing of the polymer melt, yet attenuates the hot melt into fibers primarily through the use of relatively colder air flows so as to permit formation of the fibers closer to the forming surface than in conventional apparatus and methods.

It is a yet further object of the present invention to provide an improved apparatus and method for producing meltblown fibers that uses a secondary flow of heated air to maintain the die at the desired temperature to avoid freezing of the polymer melt, yet attenuates the hot melt into fibers primarily through the use of relatively colder air flows so as to reduce the formation of zebra striping that occurs using conventional apparatus and methods and to improve uniformity due to reduced turbulence at lower forming distances.

Additional objects and advantages of the invention will be set forth in part in the description which follows, and in part will be obvious from the description, or may be learned by practice of the invention. The objects and advantages of the invention may be realized and attained by means of the instrumentalities and combinations particularly pointed out in the appended claims.

To achieve the objects and in accordance with the purpose of the invention, as embodied and broadly described herein, the apparatus and method of the present invention uses relatively cold pressurized air to assist in attenuating, i.e., drawing, the fibers to their desired diameter. As used herein, the term "cold" or "cooler" air refers to air that is at a temperature less than the melt temperature of the polymer being meltblown into fibers. A relatively smaller flow of hot air is used to shroud the inner die tip, which carries the polymer. The cold air stream shrouds and surrounds the hot air shroud. The hot and cold air streams combine to provide a quicker quench while allowing the cold air stream to draw the fibers. In addition, the flow paths of the hot and cold air streams converge at the die tip to result in a minimum amount of turbulence. The flow paths are substantially parallel so that when they combine at the die tip, the flow of air will be relatively symmetrical with little turbulence and fiber vibration resulting.

In one particular arrangement of the present apparatus and process, a relatively small flow of hot air proceeds along opposed first and second heat transfer flow channels that are configured along the outer bounds of the die tip. This hot air shrouds the capillary openings in the die tip in order to prevent the capillaries from freezing and resulting in a solidified fiber. Thus, the flow of hot air is used to ensure that the die tip does not become too cool, as such cooling would result in immediate solidification of the polymer being extruded out of the tip, thus prohibiting polymer flow through the tip. In this embodiment, cold primary air is forced through the opposed first and second attenuating flow conduits that are configured along the outer bounds of the opposed first and second heat transfer flow channels to result in an outer shroud of flowing cold primary air surrounding the inner flowing hot secondary air. Thus, the nozzle results in a coflowing arrangement where flowing cold primary air combines with the flowing hot primary air to attenuate the fibers on their way to the forming surface.

The use of cold primary air also acts to increase the rate of solidification once the fiber intersects the cold primary air near the die tip. Thus, in addition to being used to draw the fibers into the desired shape and size, the flowing cold primary air also acts to quench the fibers and solidify them.

The drawing of the fibers is temperature dependent. Relatively more heat is typically required to draw finer fibers, but then the finer fibers cool faster and so quench quicker. However, in addition to typical small diameter fibers, the present invention of cold air meltblowing, will allow the production of larger diameter fibers than conventional meltblown fibers, which have a diameter of 3 to 4 microns for polypropylene. The present invention reduces the heat input and thus reduces the heat to be removed for quench of the fibers. At lower throughputs, very fine, high strength fibers can be formed.

The forming distance between die tip and forming belt can also be reduced with the present invention because the fibers are quenched faster. The present apparatus and process allows the forming distance to be less than 8 inches and still quench the fiber adequately. Samples of fabrics with basis weights of 1.5 ounces/square yard (osy) were made at a 5 inch formation distance.

The accompanying drawings, which are incorporated in and constitute a part of this specification, illustrate an embodiment of the invention and, together with the description, serve to explain the principles of the invention.

BRIEF DESCRIPTION OF THE DRAWINGS

A full and enabling disclosure of the present invention, including the best mode thereof, to one of ordinary skill in the art, is set forth more particularly in the remainder of the specification, including reference to the accompanying drawings, in which.

DETAILED DESCRIPTION OF THE PREFERRED EMBODIMENTS

Reference now will be made in detail to the embodiments of the invention, one or more examples of which are illustrated in the accompanying drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment, can be used on another embodiment to yield a still further embodiment. Thus, it is intended that the present invention cover such modifications and variations as come within the scope of the appended claims and their equivalents. The same numerals are assigned to the same components throughout the drawings and description.

Figure 3:
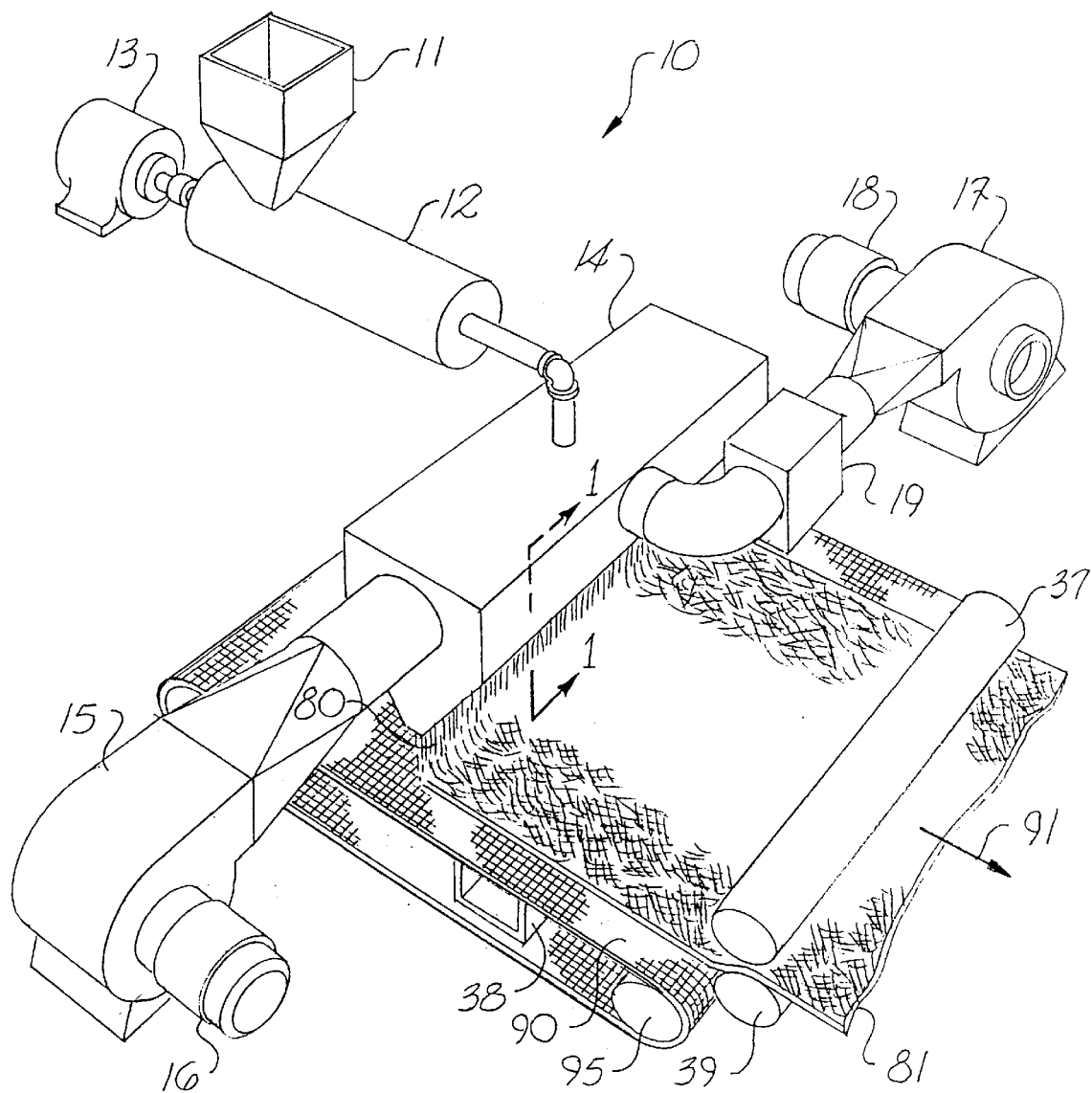
FIG. 3 is a schematic representation of an elevated perspective view of a meltblowing die apparatus and forming belt for forming meltblown webs according to the process of the present invention.

An embodiment of the apparatus for forming a meltblown web is shown schematically in FIG. 3 and is represented generally by the numeral 10. As is conventional, the apparatus includes a reservoir 11 for supplying a quantity of fiber-forming thermoplastic polymer resin to an extruder 12 driven by a motor 13.

The fiber-forming polymer is provided to a die apparatus 14 and heated therein by conventional electric heaters (not visible in the view shown). A primary flow of cold attenuating fluid, at a temperature below the melting point temperature of the particular polymer being used to form the fibers, is provided to die 14 by a blower 15, which is powered by a motor 16. A secondary flow of heating fluid, preferably air, is provided to die 14 by a blower 17, which is powered by a motor 18. An auxiliary heater 19 may be provided to bring the secondary flow of heating air to higher temperatures on the order of the melting temperature of the polymer.

At the discharge opening of die 14, quenched fibers 80 are formed and collected on a continuous foraminous screen or belt 90 into a nonwoven web 81 as belt 90 moves in the direction indicated by the arrow designated by the numeral 91. The fiber forming distance is the distance between the upper surface of collecting web 90 and the plane of the discharge opening of die 14. In accordance with the present invention, the forming distance can be on the order of less than 8 inches and still permit quenching and cooling of the fibers.

As shown in FIG. 3, collection of fibers 80 on belt 90 may be aided by a suction box 38. The formed nonwoven web 81 may be compacted or otherwise bonded by rolls 37, 39. Belt 90 may be rotated via a driven roll 95 for example.

Figure 1:
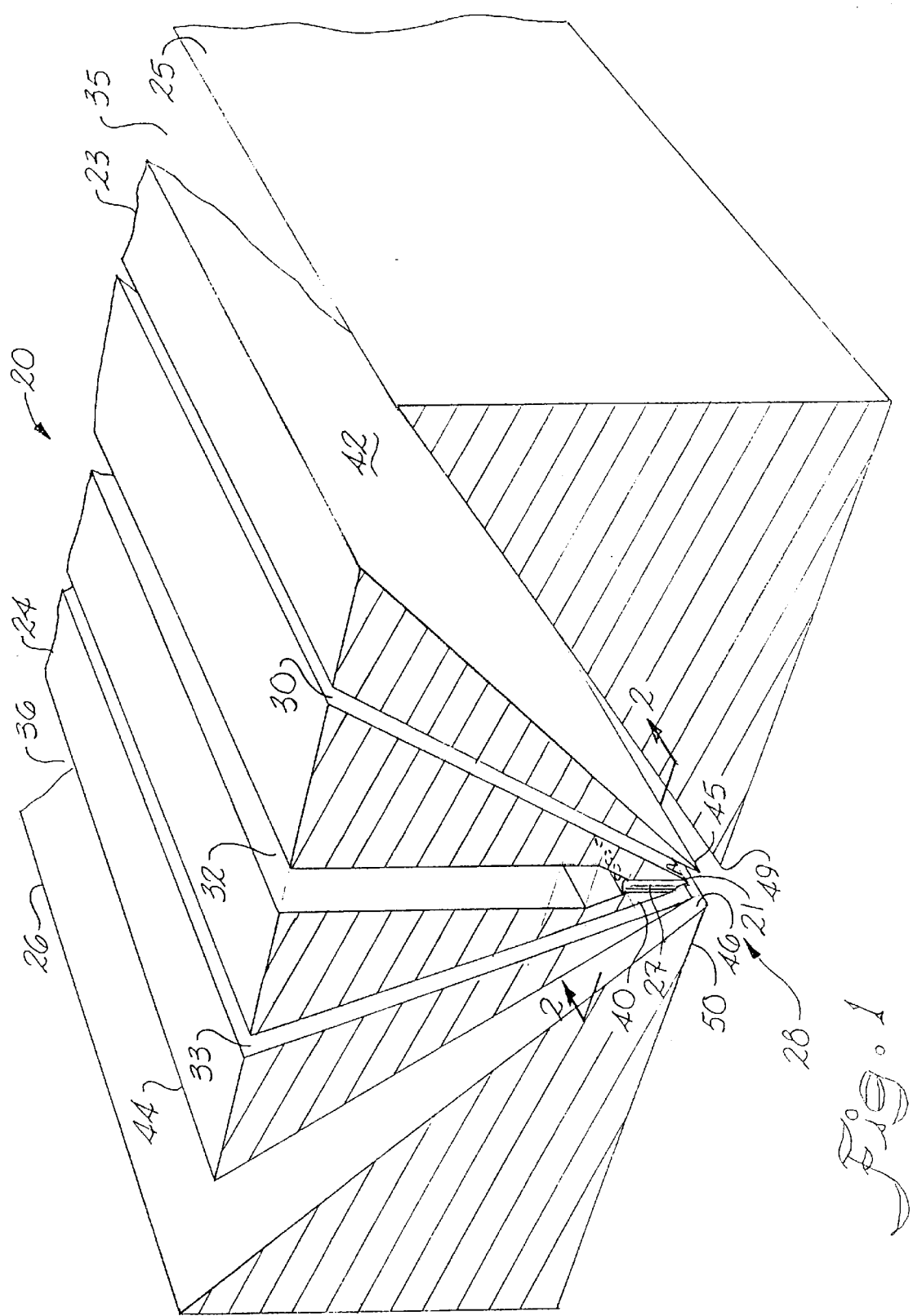
FIG. 1 is a schematic representation of an elevated perspective view of a an exemplary fiber forming portion of a die, looking in the direction of arrows 1—1 in FIG. 3 and having an embodiment of the presently described meltblowing nozzle.

An embodiment of the fiber forming portion of the meltblown die apparatus 14 looking along line 1—1 of FIG. 3 is shown schematically in FIG. 1 and is designated generally by the numeral 20. As shown therein, the fiber forming portion 20 of die apparatus 14 includes a die tip 40 that is connected to the die body (not shown) in a conventional manner. Die tip 40 is formed generally in the shape of a prism (normally an approximate 60° wedge-shaped block) that defines a knife edge 21. Knife edge 21 forms the end of the portion of the die tip 40. Die tip 40 is further defined by a pair of opposed side surfaces 42, 44 that intersect in the embodiment shown in FIG. 1 at the horizontal plan perpendicular to knife edge 21. Knife edge 21 at die tip 40 forms the apex of an angle that ranges from about 30° to 60°.

As shown in FIG. 1, die tip 40 defines a polymer supply passage 32 that terminates in further passages defined by die tip 40 which are known as capillaries 27. Capillaries 27 are individual passages formed along knife edge 21 and that generally run the length of die tip 40.

Figure 2:
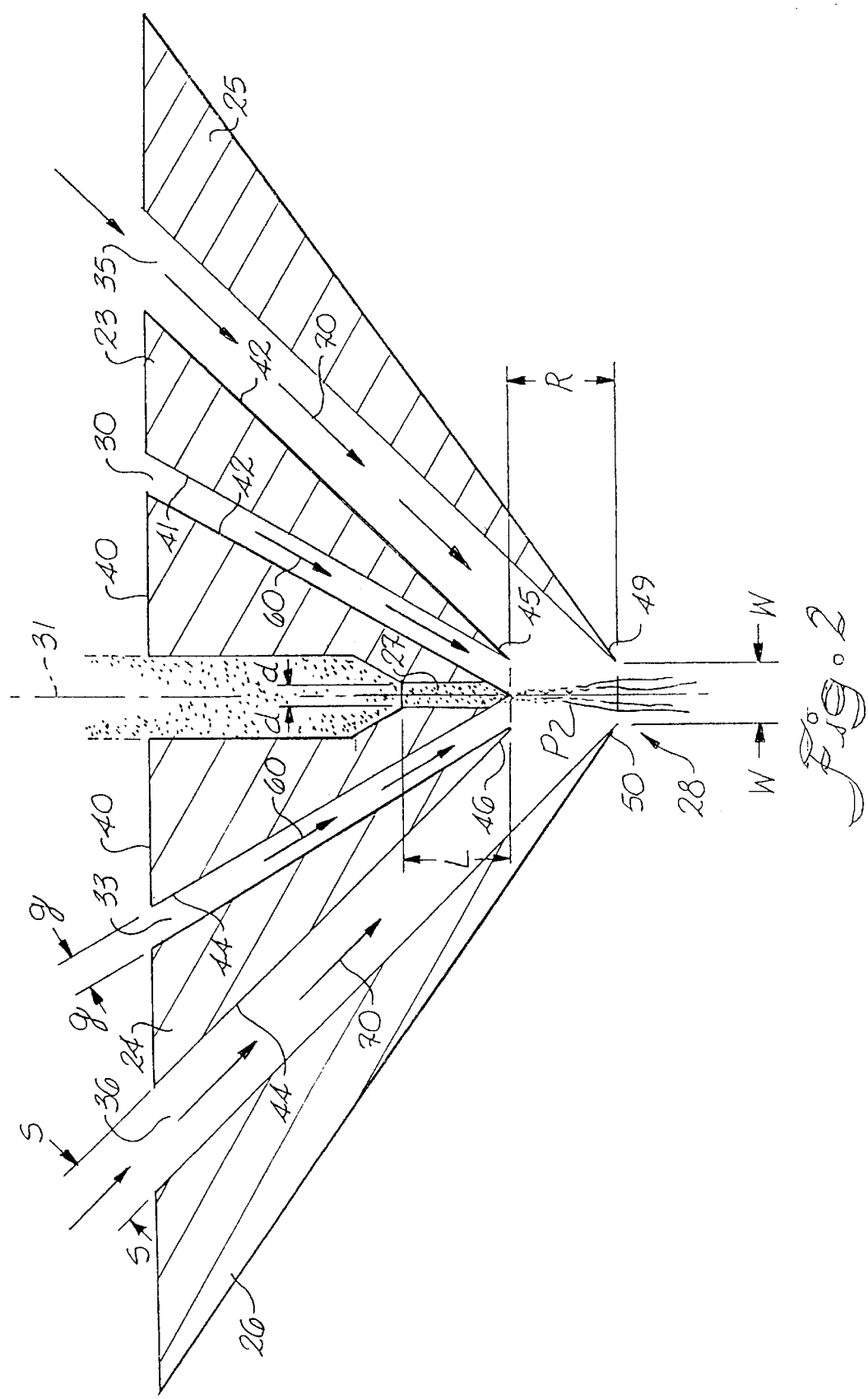
FIG. 2 is a schematic representation of a cross-sectional view of the meltblowing nozzle, looking in the direction of arrows numbered 2—2 in FIG. 1.

As shown in FIG. 2, which is an enlarged cross-sectional view of die tip 40, capillaries 27 generally have a diameter that is smaller than the diameter of polymer supply passage 32. Generally, the diameters of all the capillaries 27 will be the same so as to have uniform fiber size formation. The diameter of the capillaries 27 is indicated on FIG. 2 by the double arrows designated "d, d." A typical capillary diameter "d" is 0.0145 inches. The length of the capillary 27 is indicated on FIG. 2 by the designating letter "L". Capillaries 27 desirably have a 10/1 length/diameter ratio.

As shown in FIG. 2 for example, capillary 27 is configured to expel liquid polymer through exit opening 28 as a liquid polymer stream, which is designated by the letter "P." The liquid polymer stream P exits through exit opening 28 in die tip 40 and flows in a direction defining a first axis designated along dotted line 31 in FIG. 2.

First axis 31 bisects die tip 40 and capillaries 27.

As shown in FIGS. 1 and 2, the fiber forming portion 20 of the die apparatus 14 includes a first inner wall 23 and a second inner wall 24 disposed generally opposite first inner wall 23 as the mirror image of first inner wall 23. Inner walls 23 and 24 are also known as "hot air plates" or "hot plates." Throughout this specification, such walls may be referred to as either inner walls 23 and 24 or hot air plates 23 and 24. As shown in FIGS. 1 and 2, hot air plates 23 and 24 are configured and disposed to cooperate with die tip 40 in order to define a first secondary hot air channel 30 and a second secondary hot air flow channel 33. The secondary hot air channels 30 and 33 are located with respect to die tip 40 so that hot air flowing through the channels will shroud die tip 40. Various arrangements may be utilized to provide the initial runs of both the secondary hot air channels 30 and 33 as well as the primary cold air channels 35 and 36 (described below).

As shown in FIG. 2, the inner surface 41 of first hot air plate 23 is disposed opposite the first side surface 42 of die tip 40 and generally follows the contour of first side surface 42 of die tip 40 in forming first secondary hot air channel 30. Similarly, second hot air plate 24 is configured and disposed to cooperate with die tip 40 in order to define the second secondary hot air flow channel 33 therebetween. The inner surface 43 of second hot air plate 24 is disposed opposite the second side surface 44 of die tip 40 and generally follows the contour of second side surface 44 of die tip 40 in forming the second secondary hot air channel 33.

The secondary hot air channels 30 and 33 are the channels along which a hot air stream moves during use so that die tip 40 can remain at a sufficiently high temperature to ensure that the polymer stream P will not prematurely quench, or solidify, so that it may be drawn by the cold air employed in the present invention. In addition, the hot air shroud formed by cooperating secondary hot air channels 30 and 33 prevent the die tip 40 from freezing and breaking off.

As shown in FIG. 2, the gap in secondary hot air channels 30 and 33 is measured between inner surfaces 41 and 43 of hot air plates 23 and 24 and side surfaces 42 and 44 of die tip 40. This gap is indicated on FIG. 2 by the arrows designated "g, g".

As shown in FIGS. 1 and 2, the fiber forming portion 20 of the die apparatus 14 includes a first outer wall 25 and a second outer wall 26 disposed generally opposite first outer wall 25 as the mirror image of first outer wall 25. First and second outer walls 25 and 26 are also referred to as "cold air plates" or "cold plates" and will be referred to herein as either outer walls 25 and 26 or cold air plates 25 and 26. First cold air plate 25 is configured and disposed to cooperate with outer surface 42 of hot air plate 23 to define a first primary cold air channel 35 therebetween. Similarly, second cold air plate 26 is configured and disposed to cooperate with outer surface 44 of hot air plate 24 to define a second primary cold air channel 36 therebetween. Each of the first and second primary cold air channels 35 and 36 is configured to direct a substantial portion of fluid flowing through the channels in a direction parallel to first axis 31. In other words, the direction of the fluid that will flow through first and second cold air channels 35 and 36 can be resolved into a component of flow that is parallel to first axis 31 and a component of flow that is perpendicular to first axis 31.

As shown in FIG. 2, first and second hot air plates 23 and 24 terminate at first and second edges 45 and 46, respectively. Likewise, first and second cold air plates 25 and 26 terminate at third and fourth edges 49 and 50, respectively. In the embodiment shown in FIGS. 1 and 2, the hot air plates 23 and 24 terminate at edges 45 and 46 along the horizontal plane in which die tip 40 terminates. The cold air plates 25 and 26 terminate at edges 49 and 50 in a horizontal plane that is disposed vertically lower than die tip 40. Accordingly, the embodiment shown in FIGS. 1 and 2 can be described as a meltblown nozzle arrangement wherein the die tip is recessed from the cold air plates but flush with the hot air plates.

The width of exit opening 28 of the fiber forming portion of meltblown die apparatus 14 is designated by the letter "W" shown in FIG. 2. The width of the opening will be depend on various factors as described below, but may, in one arrangement be approximately 0.130 inches. The gap "g" as shown in FIG. 2 may be approximately 0.030 inches. As shown in FIG. 2, exit opening 28 in this embodiment coincides with the horizontal plane running through edge 49 and 50 of cold air plates 25 and 26. This plane is separated from the horizontal plane in which the terminating end of die tip 40 and edge 45 and 46 of hot air plates 23 and 24 lie. This distance separating die tip 40 from the plane of exit opening 28 is known as the die tip recess and is indicated schematically in FIG. 2 by the arrows designated "R, R." The die tip recess "R" may vary as described below. In one particular arrangement, R may be approximately 0.150 inches.

First primary cold air channel 35 and second primary cold air channel 36 are configured to be in connecting communication with a primary cold fluid source means. The primary cold fluid source means is provided for supplying to each of first and second primary cold air channels 35 and 36, a primary forced flow of fluid, preferably air, that is cold relative to the secondary hot air and molten polymer, i.e., at a temperature that is less than the melting point temperature of the polymer being meltblown. Although this temperature may obviously vary, in certain arrangements it may in the range of from about 80° to about 300° F. The temperature of this primary gaseous flow of cold fluid is below the melting temperature of the molten polymer and may be as much as 400° F. below the melting point temperature of the molten polymer.

As shown in FIG. 3, a blower 15 may provide the primary flow of cold, temperature-controlled air. Blower 15 is connected in communication with first and second primary cold air channels in a conventional manner. Blower 15 provides the velocity necessary to created a forced flow of primary cold air that may be utilized for drawing the polymer into fibers.

First and second secondary hot air channels 30 and 33 are likewise configured to be in connecting communication with a secondary hot fluid source means. The secondary hot fluid source means is provided for supplying to each of first and second hot air channels 30 and 33, a secondary flow of fluid, preferably air, that is heated to a temperature at or above the melting temperature of the molten polymer being meltblown.

As shown in FIG. 3, a blower 17 may provide the secondary flow of hot air that is heated by an auxiliary heater 19. Blower 17 is connected in communication with first and second secondary hot air channels 30 and 33 in any conventional manner. Blower 17 provides the sufficient hot air to isolate die tip 40 from the primary flow of cold air to prevent premature quenching and freezing of the die tip 40.

The particular velocities of cold air flow and hot air flow will depend on the amount of drawing force needed on the fibers, which will vary depending on the particular polymer, the temperatures utilized, and the like. Usually, the velocities for the cold air flow and the hot air flow will be relatively identical. However, there can be up to a 20% difference between the velocities, with the hot air flow velocity usually being greater than the cold air flow velocity. Care, however, should be taken to ensure that turbulence and fiber vibration does not hinder fiber formation when varying velocities are employed. Turbulence can cause fiber deformation and the formation of shot.

In accordance with the method of the present invention, meltblown fibers are produced from a die apparatus 14 that includes a die tip 40 as described above. Polymer is provided to extruder 12 from a reservoir 11. The polymer is heated within extruder 12, and motor 13 powers extruder 12 to provide the molten polymer under pressure to the polymer supply passage 32 and eventually to capillaries 27 of die tip 40.

The process of the invention may employ any polymeric material that can be extruded through the orifices of a die to form a fibrous web. Exemplary polymers such as, for example, polyamides, polyolefins, polyesters, polyvinyl alcohols, polyurethanes, polyvinyl chlorides, polyfluorocarbons, polystyrenes, caprolactams, poly (ethylene vinyl acetates), ethylene n-butyl acrylates, cellulosic and acrylic resins or copolymers and blends thereof may be utilized. Polyolefins suitable for use include polyethylene, e.g., high density polyethylene, medium density polyethylene, low density polyethylene and linear low density polyethylene; polypropylene, e.g., isotactic polypropylene, syndiotactic polypropylene, blends thereof, and blends of isotactic polypropylene and atactic polypropylene; polybutylene, e.g., poly(1-butene) and poly(2-butene); polypentene, e.g., poly(1-pentene) and poly(2-pentene); poly(3-methyl-1-pentene); poly(4-methyl-1-pentene); and copolymers and blends thereof. Suitable copolymers include random and block copolymers prepared from two or more different unsaturated olefin monomers, such as ethylene/propylene and ethylene/butylene copolymers. Polyamides suitable include nylon 6, nylon 6/6, nylon 4/6, nylon 11, nylon 12, nylon 6/10, nylon 6/12, nylon 12/12, copolymers of caprolactam and alkaline oxide diamine, and the like, as well as blends and copolymers thereof. Suitable polyesters include polyethylene terephthalate, polybutylene terephthalate, polytetramethylene terephthalate, polycyclohexylene-1,4-dimethylene terephthalate, and isophthalate copolymers thereof, as well as blends thereof. Exemplary materials also include polyacrylonitrile, linear polyesters such as esters of ethylene glycol and terephthalic acid, and of 1,4-butane diol and dimethyl terephthalic acid or terephthalic acid, polyvinylidene, polyvinyl chloride, polyvinyl butyral, polyvinyl acetate, polystyrene, linear polyurethane resins, polypropylene, polyethylene, polysulfone, polymethylpentene, polycarbonate, and polyisobutylene. Also within this category are thermoplastic cellulose derivatives, such as cellulose acetate, cellulose propionate, cellulose acetate-propionate, cellulose acetate-butyrate and cellulose butyrate. Any polymer capable of being meltblown is available for use in the present invention and the invention is not limited to using any particular polymer.

The present inventive nozzle allows various materials to be meltblown which have not heretofore been commonly subjected to meltblowing processes. For example, because the present inventive nozzle operates at a lower temperature than conventional nozzles, elastomeric materials may be meltblown and formed into a nonwoven web without sticking to the forming wire.

In addition, bicomponent fibers may be formed by the present nozzle. Bicomponent fibers are formed from at least two polymers extruded from separate extruders but then are blown together to form one fiber. The configuration of such a bicomponent fiber may be, for example, a sheath/core arrangement wherein one polymer is surrounded by another, or may be a side-by-side arrangement as illustrated in U.S. Pat. No. 5,108,820 to Kaneko et al., or may be an "islands-in-the-sea" arrangement.

Biconstituent fibers may also be formed. Biconstituent fibers are formed from at least two polymers extruded from the same extruder as a blend. These fibers are sometimes referred to as multiconstituent fibers and usually have fibrils of one of the polymers within a matrix of the major polymer. Fibers of this general type are discussed in, for example, U.S. Pat. No. 5,108,827 to Gessner.

As shown in FIG. 2, a stream of molten polymer P is provided under pressure at a temperature at or above the melting point of polymer P to each capillary 27. The molten polymer flows under pressure through each capillary 27 in the direction of first axis 31. A secondary hot gaseous flow of fluid, air for example, which is indicated in FIG. 2 by the arrows designated 60, is provided at a temperature that is at or above the melting temperature of the polymer. Heated secondary gaseous flow 60 is provided by the secondary fluid source means such as blower 17, so as to flow through first and second secondary hot air channels 30 and 33. Desirably, first and second secondary hot air channels 30 and 33 are configured so as to direct the secondary hot gaseous flow 60 at an angle that is less than 45° from the direction of first axis 31. Thus, the resulting secondary hot gaseous flow 60 may provide a proportion of polymer-attenuating flow or draw force directed with a flow component in the direction of first axis 31.

Die tip 40 may be formed of heat conducting material so that the heat content of the secondary hot gaseous flow 60 is transferred through die tip 40 to liquid polymer stream P flowing within capillaries 27 in order to maintain the molten state of polymer stream P at the desired temperature and viscosity. Moreover, as hot secondary gaseous flow 60 moves through first and second secondary hot air channels 30 and 33, a shroud of heated, secondary hot air flow 60 prevents polymer P from freezing on die tip 40 or in exit opening 28.

Die 14, including die tip 40, may be manufactured from materials conventionally used for manufacturing dies such as stainless steel. In other embodiments, the die could be manufactured from insulating materials. The die may be constructed of one piece or may be of multi-piece construction, and the die openings may be drilled or otherwise formed. For particulars as to die tip construction, reference may be had to U.S. Pat. No. 3,825,380 to Harding et al., which is incorporated herein by reference. In addition, various designs may be used for the various parts of die 14. In one particular embodiment, the outer surfaces of cold air plates 25 and 26 may be curved outward.

As shown schematically in FIG. 2, the polymer stream P leaves capillary 27 and is met first with the secondary hot air flow 60 flowing at an appropriate drawing angle to first axis 31. The secondary hot air flow 60 maintains the temperature of the polymer stream P and continues to transfer heat to die tip 40. After polymer stream P meets this secondary hot air flow 60, polymer stream P is then met with a primary cold gaseous flow of fluid, such as air, which is indicated in FIG. 2 by the arrows designated 70. This primary cold air flow 70 is provided by a primary cold fluid source means such as blower 15, so as to flow through first and second primary cold air channels 35 and 36. Generally, first and second primary cold air channels 35 and 36 are configured so as to direct the primary cold air flow 70 at an angle that is less than 45° from the direction of first axis 31. The angle of primary cold air flow 70 will usually coincide with the angle of secondary hot air flow 60 so that both flows will shroud polymer stream P without creating substantial turbulence when the air flows meet. However, such coincident is not necessarily required in order make the nozzle operational. In addition, both the gap in the secondary hot air channels 30 and 33 and the gap in the primary cold air channels 35 and 36 may vary along the lengths of the channels. In other words, it is not required that the channels have a constant diameter throughout die 14.

The resulting primary cold air flow 70 will provide a substantial proportion of attenuating flow directed with a flow component in the direction of first axis 31. As the polymer stream P moves out of capillary 27, it is subjected to the primary gaseous flows of cold attenuating fluid, desirably air. These primary cold air flows 70 impact the fibers 62 and the polymer stream P begin fragmenting into individual fibers. In addition, the primary cold air flows 70 begin quenching, or solidifying, individual fibers at temperatures below the melting point of the polymer and fixing the diameters of the quenched fibers.

The intersection of the two secondary hot air flows 60 and the intersection of the two primary cold air flows 70 in the die region below the exit of die tip 40 and above third and fourth edges of cold air plates 25 and 26 provides a mildly turbulent region for attenuation and quenching of the fibers.

In accordance with the present invention, the draw force on the fiber is provided primarily by the primary cold air flows 70, while just enough heated air is provided by secondary hot air flows 60 to keep the fiber warm during the drawing step. Thus, the primary and secondary flows are desirably provided in a proportion that uses more primary cold air than secondary hot air for providing the drawing force for the formation of fibers. Obvious energy efficiencies will be achieved in use of hot air can be minimized. While hot air usage may be minimized, a minimum amount of hot air is needed to maintain the viscosity of the polymer at a level that is suitable for drawing the fiber. The total flow of air (based on total flow rate in pounds per inch per hour) may be composed of from about 5% to about 80% hot air flow and from about 20% to about 95% cold air flow. More specifically, a hot air flow of from about 20% to about 50% may be utilized. Even more preferably, a flow of 70% primary cold air and 30% secondary hot air may be utilized.

Once the meltblown fibers have been attenuated to reach desired diameters, the process must allow for quenching, or cooling, of the fiber to solidify it. A conventional meltblown system uses hot air to keep the fiber molten and to draw the fiber. In the coflowing hot air/cold air meltblown system of the present invention, only enough hot air necessary to heat the die tip is used. Thus, the cold air meltblown system of the present invention uses a smaller amount of hot air, and thus lowers the heat load on the system.

The following example illustrates the energy efficiency advantage of the present invention. A typical air flow rate for the primary hot air that draws the fiber in a conventional system is 22 scfm/inch or 100 PIH. Typical polymer flow rates are in the range of 3 to 5 PIH. Thus, the ratio of the mass of air flow to the mass of polymer flow would be in the range of 33 (at 3 PIH) to 20 (at a 5 PIH). Assuming a 0.25 heat transfer coefficient for air and a 1.06 heat transfer coefficient for the polymer, this would place the ratio of the heat flux from the air flow to the heat flux from the polymer flow, in the range of 8 (at 3 PIH) to 5 (at a 5 PIH). Because a conventional meltblown system uses all of the primary air at 550° F., the bulk temperature of the conventional system is 550° F.

In the coflowing hot air/cold air system of the present invention, the bulk temperature under similar parameters may only be 235° F. when 30% of the air flow is at 550° F. and the remaining 70% of the air is at 100° F. Similarly, in the coflowing hot air/cold air system of the present invention, the bulk temperature is only 190° F. when 20% of the air is at 550° F. and the remaining 80% of the air is at 100° F.

Figure 4:
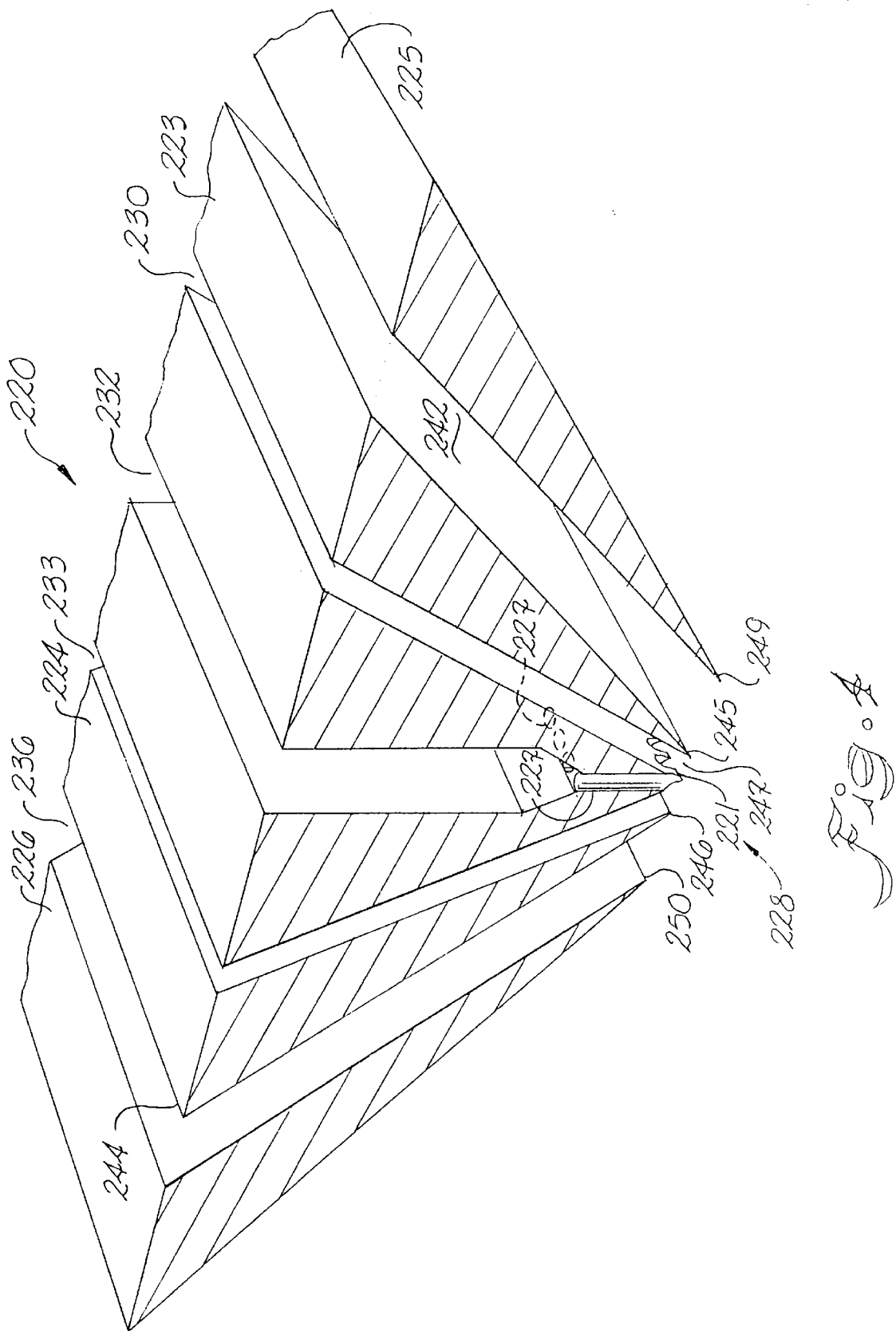
FIG. 4 is a schematic representation of an elevated perspective view of an alternative embodiment of the meltblowing nozzle of the present invention.
Figure 5:
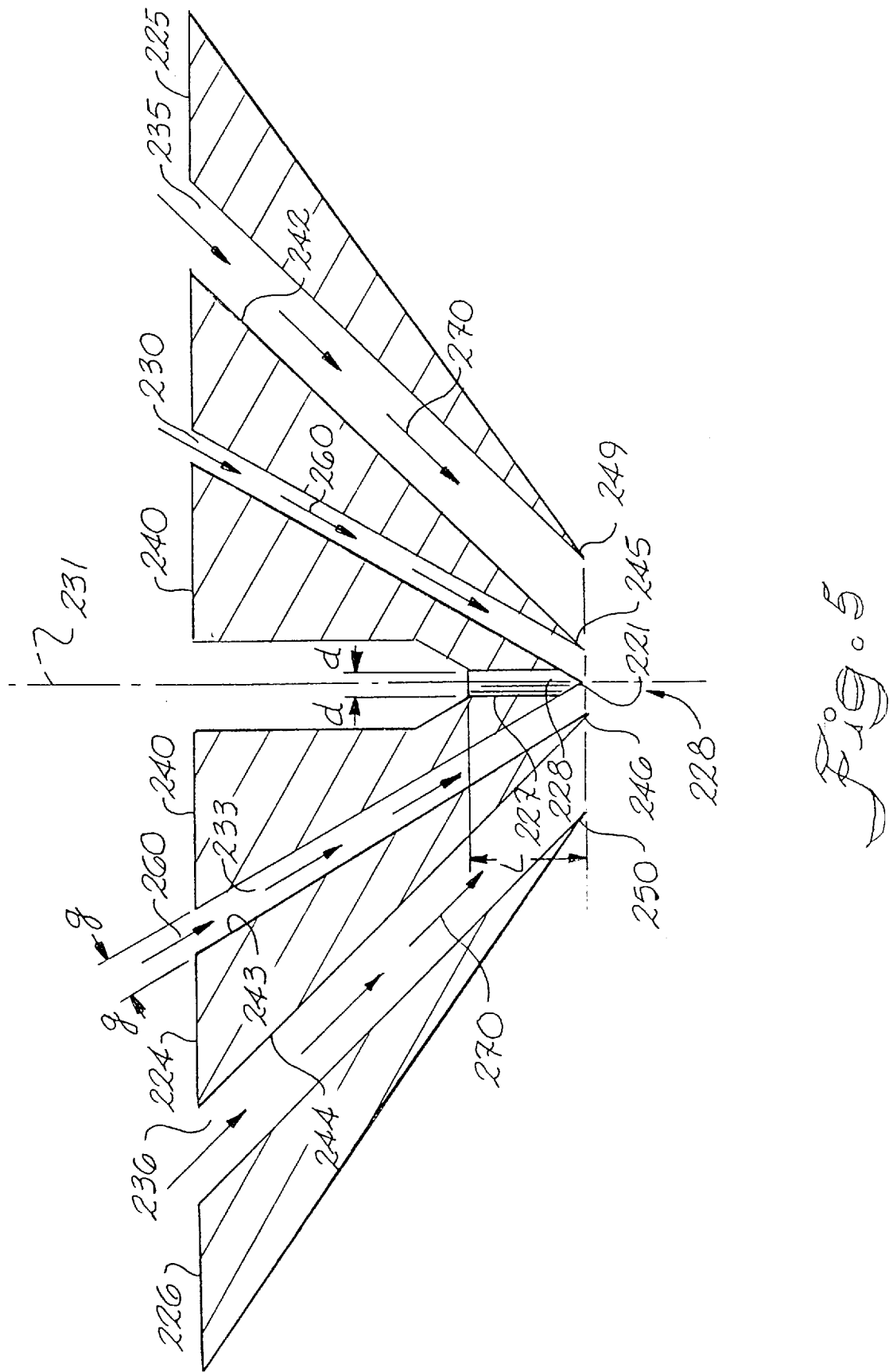
FIG. 5 is schematic representation of an end-on cross-sectional view of the embodiment shown in FIG. 4.

Various alternatives to the extended cold plate/flush hot plate embodiment shown in FIGS. 1 and 2 may be utilized in the present coflowing hot air/cold air meltblown nozzle invention. For example, alternatives to die tip 40 are shown in FIGS. 4 and 5. These Figures illustrate a coflowing hot air/cold air meltblowing nozzle which has the exit of the die tip capillaries in the same horizontal plane as both the hot air plates and the cold air plates. Thus, the embodiment shown in FIGS. 4 & 5 may be referred to as a flush cold plate/flush hot plate coflowing meltblown nozzle.

The flush cold plate/flush hot plate nozzle of FIGS. 4 and 5 utilizes features that are comparable to those described above in FIGS. 1 and 2. Such comparable features are indicated in FIGS. 4 and 5 by numerals that differ by a factor of 200 from the numbering scheme employed in FIGS. 1 and 2. There is one primary difference between the embodiment shown in FIGS. 4 and 5 and the embodiment shown in FIGS. 1 and 2: the terminating edges 249 and 250 of cold air plates 225 and 226 terminate flush with the die tip in FIGS. 4 and 5. Otherwise, the features of the nozzles in the two sets of Figures are basically identical.

Figure 6:
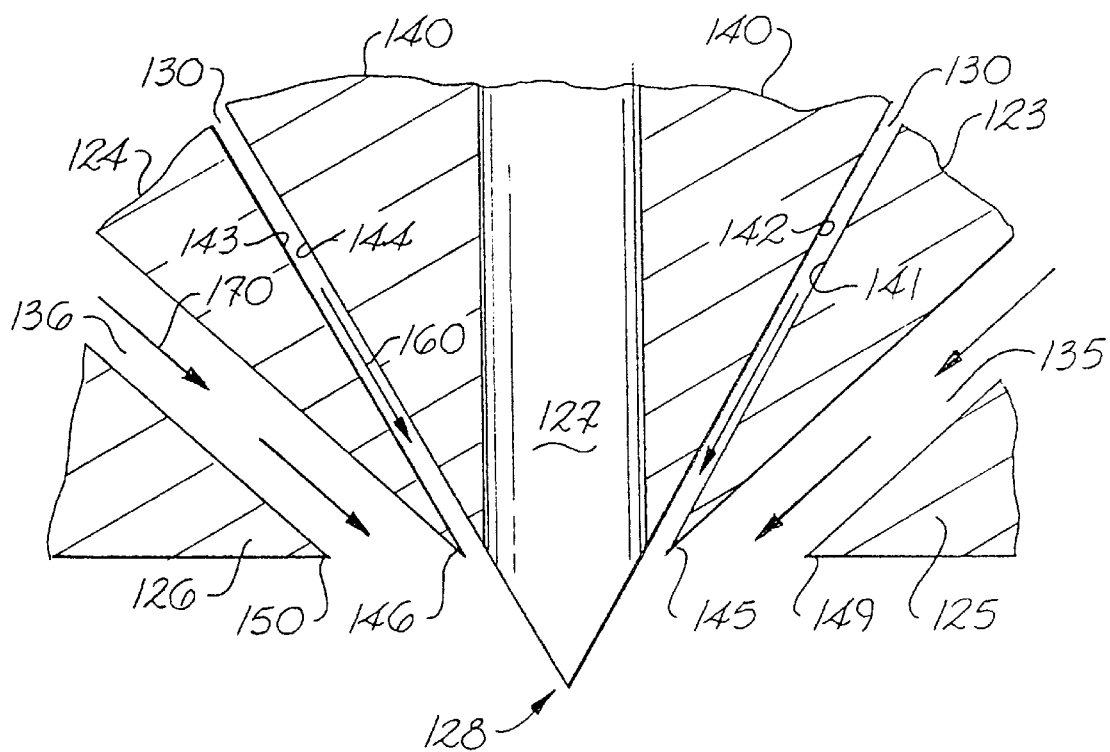
FIG. 6 is schematic representation of an end-on cross-sectional view of another alternative embodiment of the meltblowing nozzle.

Another alternative for die tip 40 is shown in FIG. 6. This Figure illustrates a coflowing hot air/cold air meltblowing nozzle which has the exit of the die tip capillaries located below the horizontal plane in which the hot air and cold air plates lie. Thus, the embodiment shown in FIG. 6 may be referred to as a recessed cold plate/recessed hot plate coflowing meltblown nozzle.

The recessed cold plate/recessed hot plate nozzle of FIG. 6 utilizes features that are comparable to those described above in FIGS. 1 and 2. Such comparable features are indicated in FIG. 6 by numerals that differ by a factor of 100 from the numbering scheme employed in FIGS. 1 and 2. There is one primary difference between the embodiment shown in FIG. 6 and the embodiment shown in FIGS. 1 and 2: the terminating edges 149 and 150 of cold air plates 225 and 226 terminate flush with terminating edge 145 and 146 of hot air plates 23 and 24 but both the cold air plates and hot air plates terminate vertically above the exit of capillary 127. Otherwise, the features of the nozzles in the two sets of Figures are basically identical.

Other embodiments of the present coflowing meltblown nozzle are also within the scope of the present invention. For example, the following other arrangements of hot air and cold air plates relative to the nozzle tip are included within the present invention:

1) recessed cold plate/flush hot plate
2) extended cold plate/extended hot plate
3) extended cold plate/recessed hot plate
4) flush cold plate/extended hot plate
5) recessed cold plate/extended hot plate
6) flush cold plate/recessed hot plate In each of these configurations, the terms "flush", "extended", and "recessed" are used relative to the position of the die tip.

The various cold plate extended meltblowing nozzles of the present invention should be formed with a certain relationship between the distance separating die tip 40 from the plane of exit opening 28 (i.e., the die tip recess from the cold air plates, or "R" as shown in FIG. 1) and the width of exit opening 28 (i.e., "W"). In addition, the various hot plate extended meltblowing nozzles of the present invention should be formed with a certain relationship between the distance separating die tip 40 from the plane in which the edges of the hot air plates would lie (i.e., the die tip recess from the hot air plates, or "X", not shown on any Figure) and the width of the opening formed between the edges of the hot air plates (i.e., "Z", not shown on any drawing).

Typical widths "W" will be in the range of from about 0.09" to about 0.13". Typical distances "R" may range up to about 0.15". Obviously, a flush arrangement will have an "R" of 0 inches. Typical distances "X" may range up to about 0.045", with a flush arrangement having an "X" distance of 0 inches. Typical widths "Z" may, likewise, range from about 0.09" to about 0.13".

The ratio of either R to W or X to Z should be equal to or less than 1.7. The maximum amount that the hot air plates may extend is related to the maximum amount that the cold air plates may extend by the ratio of the rate of the hot air flow 60 and the rate of the cold air flow 70. For example, if the hot air flow 60 is running at a rate of 6 scfm/inch and the cold air flow 70 is running at a rate of 20 scfm/inch, and an R would be 0.150 inch, then X would be 0.045 inch. These ratios provide a limit on the distance that the hot air plates or cold air plates may extend in this coflowing arrangement. Thus, using these parameters, one of ordinary skill in the art would be able to scale the nozzles of the present invention for various uses, provided the R to W and X to Z ratios do not exceed 1.7.

This ratio of 1.7 is the maximum because of the potential that higher ratios would allow the forming fibers to touch the extended plates due to vibrations. Obviously, this would be undesirable and would hinder fiber formation.

These relationships do not apply in the various embodiments wherein a plate does not extend past the die tip. Because no plates can interfere with the forming fiber, the distances between plates and the protrusion of the die tip may be any distance from the recessed or flush plates. Obviously, however, additional air will be necessary to run utilizing greater distances.

The following example are meant to be exemplary products and procedures only which aid in the understanding of the present invention.

EXAMPLES 1 AND 2

A meltblowing nozzle was set up in the extended cold plate/flush hot plate configuration shown in FIG. 2. The distance between the edges of the cold plates and the die tip ("R") was set at 0.150" and the width of the exit opening ("W) was set at 0.110".

Polypropylene reactor granules with a peroxide coating obtained from Montell USA Inc. of Wilmington, Del., were used as the polymer to be meltblown into fibers. The temperature of the hot air was set at 650° F. and the temperature of the cold air was approximately 90° F. The polymer melt point temperature was 550° F. The hot air flow rate was 273 scfm at 7.9 psig (pounds per square inch gauge) pressure and the cold air flow rate was 597 scfm at 10.0 psi pressure. Thus, the flow rate mixture of the total 870 scfm was approximately 69% cold air and approximately 31% hot air.

The die tip utilized had 30 capillaries/inch of die width and the capillaries had a 10 to 1 length to diameter ratio (0.0145" diameters). The polymer was provided at a rate of 2 PIH. The forming distance between the die and the forming belt for the coflowing arrangement was 5 inches.

Both a 0.15 osy basis weight and a 1.50 osy basis weight fabric were made according to the present coflowing process. The use of the coflowing cold air/hot air meltblown nozzle allowed the use of a forming distance that was approximately half of the forming distance required when using standard meltblowing nozzles.

EXAMPLE 3

In order to compare the temperatures involved in the present inventive nozzle with temperatures in a standard meltblowing nozzle, the following observations were made. The coflowing nozzle of the present invention (as shown in FIG. 2) was run with polypropylene and a hot air temperature of 490° F. (8 psig) and a cold air temperature of approximately 90° F. (10 psig). The temperature, utilizing an OMEGA 05521 Infra Red Gun (a thermocouple device), was taken at various points along the nozzle centerline. As a comparison, a similar polymer was run using a standard meltblowing nozzle. In the standard nozzle, a primary hot air temperature of 500° F. was utilized and a pressure of 7.8 psig. Polymer flow rates for both processes was 1 PIH and the melt temperature of the polymer was 520° F.

The temperature at the exit opening of the hot air flow channel was 388° F. for the inventive nozzle and 500° F. for the standard nozzle. The temperature at exit opening of the cold air flow channel (upon merger with the hot air flow) was 230° F. for the inventive nozzle. At a distance approximately 0.50 inches below the exit opening, the temperature of the inventive nozzle was 134° F. and the temperature of the standard nozzle would typically be about 450° F. At a 14-inch forming distance, the web temperature as the fibers were deposited onto the screen for the inventive nozzle was about 95° F. and for the standard nozzle was 157° F.

These comparative examples show that shorter forming distances can be employed when the nozzle of the present invention is utilized in the die. In addition, the examples indicate that quenching occurs much sooner with the present nozzle as demonstrated by the lower temperatures at every point between die tip and forming belt. In addition, these examples show that polymer throughputs of a desirable 2 PIH may be used at these forming distances. Previously, in order to utilized such short forming distances, the throughputs had to be on the order of 0.5 PIH and less.

Although a preferred embodiment of the invention has been described using specific terms, devices, and methods, such description is for illustrative purposes only. The words used are words of description rather than of limitation. It is to be understood that changes and variations may be made by those of ordinary skill in the art without departing from the spirit and scope of the present invention which is set forth in the following claims. In addition, it should be understood that aspects of the various embodiments may be interchanged, both in whole or in part.

What is claimed is:

1. A method for producing fibers from a die, the method comprising:

providing a stream of molten polymer under pressure at a first temperature through an orifice within the die in the direction of a first axis;

attenuating said molten polymer stream into a plurality of discrete fiber strands by subjecting the molten polymer stream to a coflowing arrangement of fluid under pressure moving at a predetermined flow rate, said coflowing arrangement comprising a primary forced cold air flow having a substantial proportion of said flow directed with a flow component in the direction of said first axis and being used primarily to attenuate said polymer stream, said cold air flow having a temperature below the melting point temperature of said molten polymer, said coflowing arrangement further comprising a secondary forced hot air flow having a temperature that is higher than the temperature of said cold air flow and is further sufficiently high so as to prevent premature quenching of said molten polymer stream.

2. A method as in claim 1, wherein said cold air flow is at a temperature of at least 300° F. less than the temperature of said hot air flow.

3. A method as in claim 1, wherein said cold air flow comprises from about 5% to about 80% of the total of said cold air flow and said hot air flow.

4. A method as in claim 1, wherein said cold air flow comprises from about 50% to about 80% of the total of said cold air flow and said hot air flow.

5. A method as in claim 1, wherein said cold air flow comprises about 30% of the total of said cold air flow and said hot air flow.

6. A method as in claim 1, wherein the velocity of said cold air flow is no more than 20% different than the velocity of said hot air flow.

* * * * *